United States Patent [19]
Rahman et al.

[11] Patent Number: 6,002,670
[45] Date of Patent: Dec. 14, 1999

[54] OPTIMIZATION AND RECOVERY TECHNIQUES IN IMA NETWORKS

[75] Inventors: Reshad Rahman, Ottawa; Douglas H. Patriarche, Nepean; Richard Vallee, Gatineau; Stuart C. White, Nepean, all of Canada

[73] Assignee: Nortel Networks Corporation, Montreal, Canada

[21] Appl. No.: 08/989,682

[22] Filed: Dec. 12, 1997

[51] Int. Cl.$^6$ .............................. G08C 15/00; H04J 3/14
[52] U.S. Cl. ..................... 370/238; 370/252; 370/536; 709/241
[58] Field of Search ..................... 370/238, 252, 370/253, 230–233, 235, 254, 255, 400, 395, 585, 536, 542; 340/827; 395/200.71, 200.73; 709/239–244

[56] References Cited

U.S. PATENT DOCUMENTS

| | | | |
|---|---|---|---|
| 5,088,032 | 2/1992 | Bosack | 395/200.72 |
| 5,115,495 | 5/1992 | Tsuchiya et al. | 395/200.69 |
| 5,163,042 | 11/1992 | Ochiai | 370/238 |
| 5,218,676 | 6/1993 | Ben-Ayed et al. | 395/200.7 |
| 5,521,910 | 5/1996 | Matthews | 370/256 |
| 5,596,719 | 1/1997 | Ramakrishna et al. | 395/200.71 |
| 5,596,722 | 1/1997 | Rahnema | 395/200.71 |
| 5,600,794 | 2/1997 | Callon | 370/351 |
| 5,606,669 | 2/1997 | Bertin et al. | 370/200.53 |
| 5,608,733 | 3/1997 | Vallee et al. | 370/394 |
| 5,822,301 | 10/1998 | Arnold et al. | 370/238 |

*Primary Examiner*—Douglas W. Olms
*Assistant Examiner*—Seema S. Rao
*Attorney, Agent, or Firm*—Gowling, Strathy & Henderson; Yoshiharu Toyooka

[57] ABSTRACT

In ATM networks, digital data in ATM cells are sent to a destination node over a connection made up of more than one transmission link in round robin fashion. This is called inverse multiplexing. Suitable transmission links are selected among a plurality of provisionable transmission links according to some selection criteria. According to some embodiments of the invention, the selection criteria are minimum delay and maximum bandwidth.

14 Claims, 2 Drawing Sheets

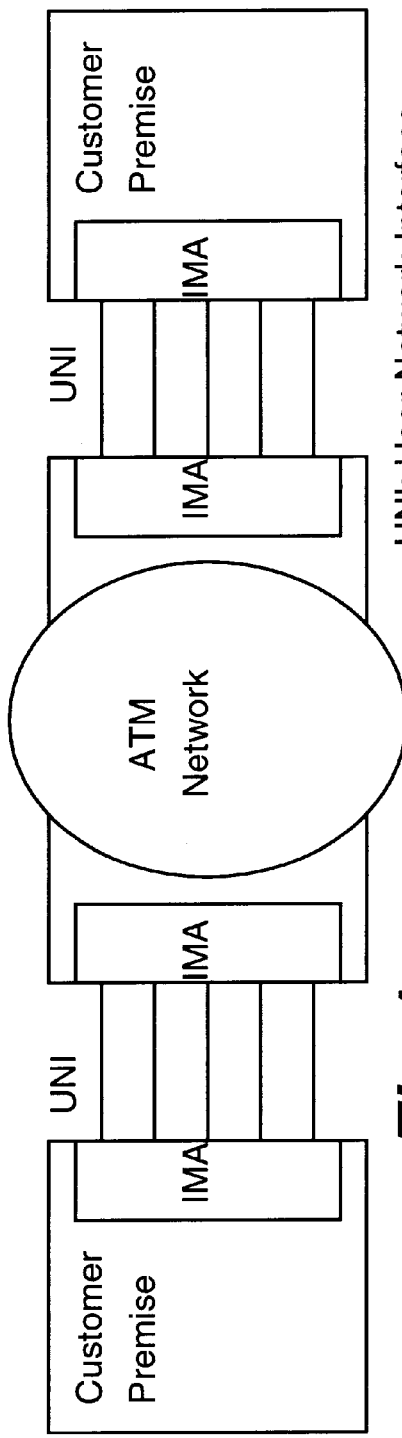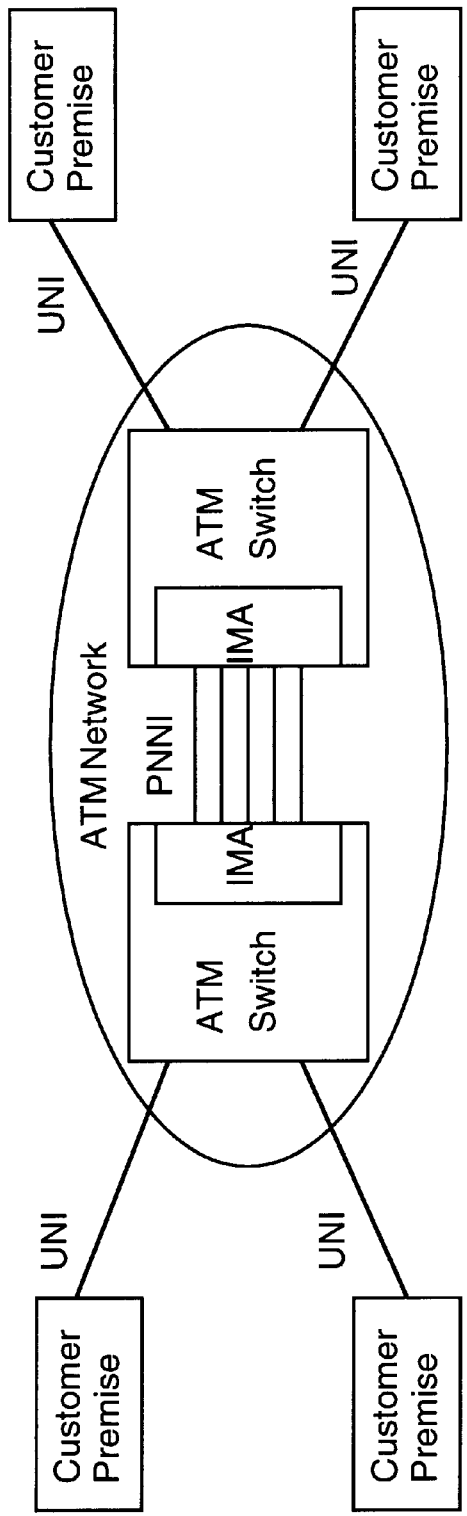

OPTIMIZATION AND RECOVERY TECHNIQUES IN IMA NETWORKS

FIELD OF THE INVENTION

The invention resides in the field of the ATM inverse multiplexing. In particular, it is directed to an ATM inverse multiplexing technique which enables link selection to be performed at any time according to one of a plurality of selection criteria.

BACKGROUND OF THE INVENTION

It has been recognized that the T1/E1 rate (1.544/2.048 Mbit/s) is a cost effective way of user access to an ATM network as well as connection between ATM network switches. However, as ATM technology for wide area networks is deployed more and more, demands for transmission links of a rate higher than T1/E1 are increasing. Links of higher rates, such as T3/E3 (44.736/34.368 Mbit/s), have been designed to meet these needs. However, the cost of T3/E3 links is still prohibitive in many cases and the ratio of cost versus realistic utilization of the entire rate is not always attractive and fully justified for new ATM end users and service providers. IMA (short for inverse multiplexing for ATM) satisfies the need by using multiple T1/E1 links which are grouped collectively to provide the service at a higher rate.

FIG. 1 and FIG. 2 show two sample configurations in which IMA is used. In this specification, inverse multiplexing for ATM and ATM devices performing inverse multiplexing are collectively called IMA. FIG. 1 depicts a user access to a network through user network interfaces (UNIs) and FIG. 2 illustrates a link connection between ATM switches through broadband inter-carrier interfaces (BICIs) or private network to network interfaces (PNNIs).

Referring to the figures, the basic function of IMA device is to work in pairs to take an ATM cell stream coming from the ATM layer, send it over the multiple links by spreading cells over the available links and ensure that the initial cell stream can be retrieved at the far end. Thus the IMA preferably makes the ATM traffic transparent to the ATM layer over multiple links in use. As far as the ATM layer is concerned, it should only see a pipe (can be considered as a virtual link) whose rate is now the sum of the multiple link rates. It is assumed that each link is run in clear-mode without the presence of intermediate ATM nodes processing ATM cells. This means that there should be no cell discard by any intermediate transmission equipment.

U.S. Pat. No. 5,608,733, Mar. 4, 1997, Vallee et al uses ATM sequence number cells indicating a specific round robin order of a plurality of transmission links over which ATM data cells are transmitted. The ATM sequence number cells also indicate whether or not a destination is ready to receive ATM data cells in that specific round robin order.

The present invention extends further a variety of functionalities which are useful in inverse multiplexing.

OBJECT OF THE INVENTION

It is therefore an object of the invention to provide a method of and apparatus for sending ATM traffic over a connection consisting of a plurality of transmission links.

It is a further object of the invention to provide a method of sending a series of ATM cells between IMA devices over a connection consisting of a plurality of transmission links, transparent to the ATM layer.

It is also an object of the invention to perform IMA over a connection consisting of a plurality of transmission links which are selected according to one of a plurality of selection criteria.

It is another object of the invention to provide a method of sending ATM traffic over a connection which consists of a plurality of transmission links and has been reconfigured after the connection start-up.

It is a further object of the invention to provide a method of handling link failure and link reconfiguration.

It is yet another object of the invention to provide a method of handling link configuration or reconfiguration according to one chosen set of a plurality of possible link setting criteria.

SUMMARY OF THE INVENTION

Briefly stated, the invention resides in inverse multiplexing digital data. According to one aspect, the invention is directed to a method of selecting any of a plurality of transmission links for a connection. The method comprises steps of obtaining transmission parameters of the transmission links and determining one or more subsets of all transmission links whose transmission parameters meets one or more preset requirements. The method includes further steps of choosing one of a plurality of selection criteria and selecting one subset of transmission links among all the subsets determined above for activation in response to the chosen criterion.

BRIEF DESCRIPTION OF THE DRAWINGS

For a more complete understanding of the invention and for further objects and advantages thereof, reference may now be made to the following description, taken in conjunction with the accompanying drawings, in which:

FIG. 1 shows a sample configuration involving IMA UNIs;

FIG. 2 shows a sample configuration involving IMA BICIs or PNNIs;

DETAILED DESCRIPTION OF THE PREFERRED EMBODIMENTS

Figure 3:
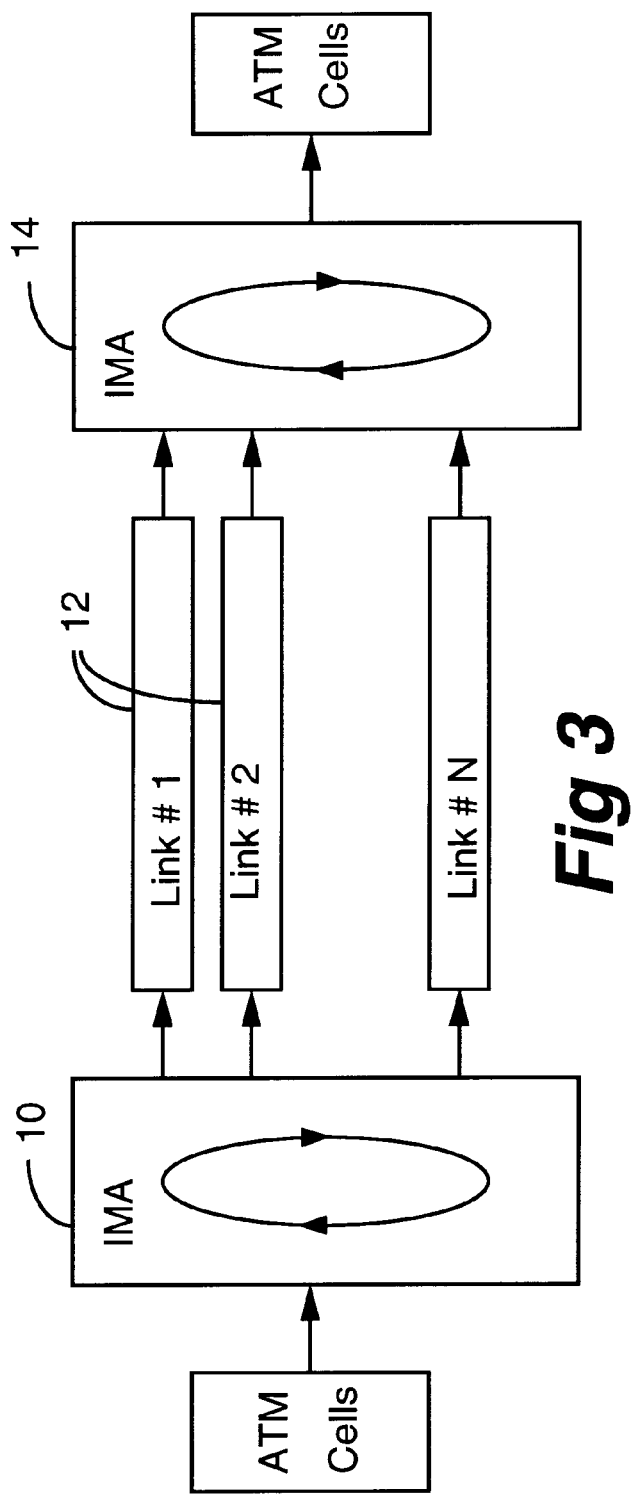
FIG. 3 is a schematic illustration of multiplexing and demultiplexing of ATM cells over IMAs and links.

FIG. 3 shows how the ATM cells are demultiplexed and then multiplexed over IMAs in one direction. At the (near end) transmitting node, an IMA 10 takes a series of ATM cells from an ATM layer device. It spreads ATM cells and transmits each cell over each of N transmission links, N being a positive integer. The N transmission links form a link group and there may be more than one link group between the nodes. The order of transmission is in the round robin fashion within the link group. At the (far end) receiving node, cells from N links are assembled and sent to an ATM layer device by an IMA 14. This process is called an inverse multiplexing The same order must be employed at this node to recover a proper sequence of cells. Both nodes must be aware of the round robin order which is to be employed. Upon initialization, therefore, both IMAs send a series of special cells (e.g. sequence number cells) in round robin fashion over the links, e.g. T1/E1 links. This allows the receiver IMA at both nodes to establish the sequence in which to read cells from the incoming links as well as to adjust relative link delay.

Links within an IMA link group may have different delays which may also vary in time. Thus, cells transmitted in a given order may not be received in the same order at the far end. In fact, a cell may be received significantly later than another cell that followed it in the original cell streams.

The receiving IMA device must preserve cell order; to do this it buffers cells received on each link and compensates for the differential delays prior to recombining the cells into the single stream. The term link delay synchronization (LDS) is used to indicate that a receive link's differential delay, relative to its peers in the IMA link group, has been measured and compensated for.

In the process of IMA group startup, while establishing communication with the far end node, the IMA measured the differential delay of the receive links. If a link's differential delay is within a specified maximum, the link is declared to be in LDS, and it can be accepted as an active member of the link group. If the link's differential delay exceeds the specified maximum, the link is not in LDS and is rejected as an active member. When both near and far ends agree on which links are acceptable, they can start exchanging user cells.

The IMA continually monitors and compensates for the differential delay of its links. If a link's delay changes such that it exceeds the specified maximum differential delay, the link is declared to have experienced loss of delay synchronization (LODS), and is deactivated from the group.

When a change of link configuration occurs by a link being added, removed or declared as being down, each node sends a series of ICP (IMA Control Protocol) cells to allow the far-end node to reestablish the sequence of cells to read from the incoming links.

A set of IMA link configuration procedures is accepted in the industry, such as the IMA group startup which includes "Addition of a link to an IMA group", "Deletion of a link from an IMA group, and "Deactivation of a link from an IMA group due to a link or IMA fault".

Referring to FIG. 3 again, the IMA device provides provisioning and monitoring of the IMA groups. In one arrangement, up to 8 IMA groups are supported and one IMA group may comprise 1 to 8 ports, each handling one transmission link.

According to the above accepted procedures, the IMA device provides the user with the following options;

(1) Selection of the maximum differential link delay to be tolerated within the group (a default value of 25 milliseconds being widely accepted); and (2) Selection of the period of time to wait before attempting to reactivate a failed link.

Because the receiving IMA equalizes the delay of all links active in the IMA group, the IMA virtual link effectively exhibits a transmission delay equal to that of the greatest delay link active in the group. Thus the following trade-off must be made when selecting the maximum differential delay to be supported: a larger value may permit more links to be activated within the group, but admission of these links may result in a larger effective transmission delay for the IMA virtual link. Because the maximum differential delay to be supported is provisionable, the user can select the best value for a given application.

Selection of other transmission characteristics parameters is also possible for provisioning transmission links, such parameters as bit error rate, transit delays etc.

As mentioned above, there are more than one transmission links in an IMA link group. At a connection startup or reconfiguration, certain links are selected for activation based on transmission characteristics of each link etc., such as those mentioned immediately above. It is however recognized now that there may be other criteria which can be used for selecting links for certain conditions. When certain provisioned transmission links do not meet minimum requirements, other selection criteria can be used for link activation.

As one example, according to one embodiment of the invention, such selection criteria as "minimize delay" and "maximize bandwidth" can be used when not all provisioned links in the group conform to the maximum differential delay.

When the criterion is minimum delay, links are selected for activation as follows. First the least delay link is selected as the reference link. Then, all links with differential delay relative to the reference link less than or equal to the provisioned maximum differential delay are selected for activation. Any links with relative differential delay greater than the provisioned maximum are rejected and are considered to be in a Loss of Delay Synchronization (LODS) condition. Using this criterion will ensure that the IMA virtual link has the lowest effective transmission delay possible given the maximum acceptable differential delay, but it may restrict the throughput capacity of the IMA virtual link.

When the criterion is maximum bandwidth, links are selected for activation as follows. Each link in turn is considered to be the reference link, and the corresponding set of acceptable links is determined. The acceptable links are those with differential delay relative to the reference link less than or equal to the provisioned maximum differential delay. The largest set of acceptable links is then selected for activation; if there are multiple sets of the largest size the one with the lowest delay link is selected. Any unacceptable links are rejected and are considered to be in a LODS condition. Using this criterion will ensure that the IMA virtual link has the greatest throughput capacity possible given the maximum acceptable differential delay, but it may result in a larger effective transmission delay of the IMA virtual link.

In one embodiment, available criteria are presented to the user for selection but default is set to the maximum bandwidth. The selection of criteria and/or execution of link selection according to the chosen criterion can be made at any time, either at the connection startup or at reconfiguration.

Figure 4:
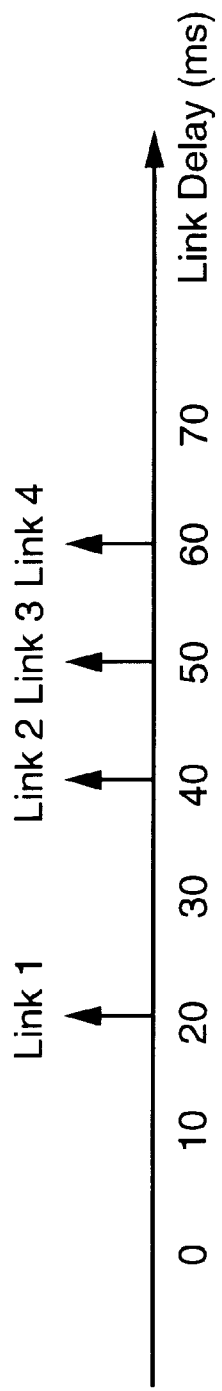
FIG. 4 is an illustration of selection criteria.

FIG. 4 provides an example illustrating the two selection criteria. Assuming that the IMA group has been provisioned to accept a maximum differential delay of 25 milliseconds, then two different sets of links would be activated depending on the chosen link selection criterion. If the least delay is used, links 1 and 2 would be activated, and the effective transmission delay of the IMA virtual link would be 40 milliseconds. If the maximum bandwidth is used, links 2, 3, and 4 would be activated, and the effective transmission delay of the IMA virtual link would be 60 milliseconds.

Note that there is no requirement for the near end and far end IMA groups to have the same provisioning. However, if provisioning does not match, it may result in one end rejecting links that the other end finds acceptable; these links will not be activated since a link must be accepted by both sides in order to be activated.

The above embodiments use "maximum bandwidth" and "minimum delay" as two possible criteria. It should be noted that other transmission characteristics can be used as the selection criteria.

According to yet another embodiment, two ends negotiate for the criterion to be chosen. In one case, one end can be a master and the other a slave, in that the master imposes the set of criteria to be used. Alternatively, the master specifies what links it wants selected. In this way, cases where both ends choose disjoint sets can be avoided.

What is claimed is:

1. A method of selecting two or more transmission links for provisioning a connection between two ends for the purpose of inverse multiplexing digital data therebetween, comprising steps of:

obtaining transmission parameters of transmission links available for the connection;

determining one or more subsets of all transmission links whose transmission parameters meet one or more preset requirements, each subset containing two or more transmission links;

choosing one of a plurality of selection criteria; and selecting one subset of transmission links among all the subsets determined above for activation for inverse multiplexing in response to the chosen criteria.

2. The method according to claim 1, wherein the preset requirement is any one of maximum differential delay, bit error rate and transmission delays.

3. The method according to claim 2, wherein the selection criteria are the minimum delay and the maximum bandwidth of the connection.

4. The method according to claim 3, wherein the chosen criterion is the minimum delay, the method comprising further steps of:

determining the transmission links which has the least transmission delay; and selecting one subset of transmission links which includes the transmission link having the least transmission delay.

5. The method according to claim 4, comprising a further step of:

negotiating between two ends of the connection as to a selection of particular transmission links or the chosen criterion to use to select transmission links.

6. The method according to claim 4, comprising a further step of:

one end imposing upon the other end of the connection already selected transmission links or the chosen criterion to use to select transmission links.

7. The method according to claim 3, wherein the chosen criterion is the maximum bandwidth, the method comprising further steps of:

selecting one subset of transmission links which has the largest number of the transmission links within said subset.

8. The method according to claim 7, wherein the chosen criterion is the maximum bandwidth, the method comprising further steps of:

if there are two or more subsets with the same largest number of transmission links, selecting one subset which includes the transmission link having the least transmission delay.

9. The method according to claim 8, comprising a further step of:

one end imposing upon the other end of the connection already selected transmission links or the chosen criterion to use to select transmission links.

10. The method according to claim 8, comprising a further step of:

negotiating between two ends of the connection as to a selection of particular transmission links or the chosen criterion to use to select transmission links.

11. The method according to claim 7, comprising a further step of:

one end imposing upon the other end of the connection already selected transmission links or the chosen criterion to use to select transmission links.

12. The method according to claim 7, comprising a further step of:

negotiating between two ends of the connection as to a selection of particular transmission links or the chosen criterion to use to select transmission links.

13. The method according to claim 1, comprising a further step of:

one end imposing upon the other end of the connection already selected transmission links or the chosen criterion to use to select transmission links.

14. The method according to claim 1, comprising a further step of:

negotiating between two ends of the connection as to a selection of particular transmission links or the chosen criterion to use to select transmission links.

* * * * *